United States Patent
Fox et al.

(10) Patent No.: US 6,654,786 B1
(45) Date of Patent: Nov. 25, 2003

(54) METHOD AND APPARATUS FOR INFORMING WIRELESS CLIENTS ABOUT UPDATED INFORMATION

(75) Inventors: Mark A. Fox, San Francisco, CA (US); Peter F. King, Half Moon Bay, CA (US); Seetharaman Ramasubramani, San Jose, CA (US); Bruce K. Martin, Jr., Palo Alto, CA (US); Stephen S. Boyle, Fremont, CA (US)

(73) Assignee: Openwave Systems Inc., Redwood City, CA (US)

( * ) Notice: Subject to any disclaimer, the term of this patent is extended or adjusted under 35 U.S.C. 154(b) by 551 days.

(21) Appl. No.: 09/651,902

(22) Filed: Aug. 30, 2000

Related U.S. Application Data

(63) Continuation of application No. 09/071,377, filed on Apr. 30, 1998, now abandoned.

(51) Int. Cl.⁷ .............................................. G06F 15/16
(52) U.S. Cl. ...................... 709/203; 709/219; 709/225; 709/238
(58) Field of Search ................................. 709/203, 225, 709/709, 238, 310, 219, 220, 250; 370/466, 254

(56) References Cited

U.S. PATENT DOCUMENTS

| | | | |
|---|---|---|---|
| 5,475,758 A | 12/1995 | Kikuchi | |
| 5,768,519 A | 6/1998 | Swift et al. | |
| 5,774,552 A | 6/1998 | Grimmer | |
| 5,818,448 A | 10/1998 | Katiyar | |
| 5,861,883 A * | 1/1999 | Cuomo et al. | 345/733 |
| 5,893,091 A | 4/1999 | Hunt et al. | |
| 5,903,882 A | 5/1999 | Asay et al. | |
| 5,931,917 A * | 8/1999 | Nguyen et al. | 709/250 |
| 5,970,475 A | 10/1999 | Barnes et al. | |
| 6,012,083 A | 1/2000 | Savitzky et al. | |
| 6,035,336 A | 3/2000 | Lu et al. | |
| 6,035,423 A | 3/2000 | Hodges et al. | |
| 6,049,602 A | 4/2000 | Foladare et al. | |
| 6,072,874 A | 6/2000 | Shin et al. | |
| 6,092,194 A | 7/2000 | Touboul | |
| 6,092,201 A | 7/2000 | Turnbull et al. | |
| 6,094,485 A | 7/2000 | Weinstein et al. | |
| 6,105,027 A | 8/2000 | Schneider et al. | |
| 6,131,163 A | 10/2000 | Wiegel | |
| 6,134,550 A | 10/2000 | Van Oorschot et al. | |
| 6,138,158 A * | 10/2000 | Boyle et al. | 709/225 |
| 6,223,291 B1 | 4/2001 | Puhl et al. | |
| 6,269,456 B1 | 7/2001 | Hodges et al. | |
| 6,314,108 B1 * | 11/2001 | Ramasubramani et al. | 370/465 |
| 6,314,517 B1 | 11/2001 | Moses et al. | |
| 6,385,728 B1 | 5/2002 | DeBry | |
| 6,421,781 B1 | 7/2002 | Fox et al. | |
| 6,507,589 B1 * | 1/2003 | Ramasubramani et al. | 370/465 |

OTHER PUBLICATIONS

HDTP Specification, Version 1.1–Draft, pp. 1–40, Redwood Shores, CA, Unwired Planet, Inc., Jul. 15, 1997.
HDML 2.0 Language Reference, Version 2.0, pp. 1–56, Redwood Shores, CA, Unwired Plant, Inc., Jul. 1997.

* cited by examiner

*Primary Examiner*—Zarni Maung
(74) *Attorney, Agent, or Firm*—Blakely, Sokoloff, Taylor & Zafman LLP

(57) ABSTRACT

A unified interface is disclosed for sending update notifications to different wireless clients on different wireless networks. The update notifications may be push notifications or pull notifications. Push notifications include a data payload with updated information. Pull notifications merely specify an address where update information is available. The updated information must be "pulled" using the supplied address. Several maintenance requests are provided for querying notification status, deleting individual notifications, and clearing all notifications addressed to a particular subscriber.

30 Claims, 4 Drawing Sheets

METHOD AND APPARATUS FOR INFORMING WIRELESS CLIENTS ABOUT UPDATED INFORMATION

This is a continuation of U.S. patent application No. 09/071,377 of Mark A. Fox et al., filed on Apr. 30, 1998, and entitled, "Method and Apparatus for Informing Wireless Clients About Updated Information", now abandoned.

BACKGROUND OF THE INVENTION

1. Field of Invention

The present invention relates generally to data communications between computer network and a plurality of wireless computing devices. In particular, the present invention relates to a method and apparatus for notifying wireless computing devices about updated information.

2. Description of the Related Art

The Internet is a rapidly growing communication network of interconnected computers around the world. Together, these millions of connected computers form a vast repository of hyperlinked information that is readily accessible by any of the connected computers from anywhere at any time. To provide mobility and portability to the Internet, wireless computing devices have been introduced. The wireless computers are capable of communicating with the computers on the Internet using wireless data networks connected to the Internet. With wireless computers using wireless data networks, people are able to travel about and yet perform the same tasks they could do with computers directly connected to the Internet.

The most common wireless access paradigm of today is a laptop personal computer equipped with a wireless communication mechanism. For example, a laptop may be equipped with a wireless modem for communication with the Internet. This paradigm may be useful for a considerable number of applications and users, but there has been a growing need for a mobile paradigm in which the Internet can be instantly accessed by smaller mobile computing devices such as mobile phones and Personal Digital Assistants (PDAs). With increasing data processing capabilities in the new smaller mobile computing devices, more and more users are carrying such devices around to convert unproductive time into productive time.

With a small wireless internet device, a traveler may request the departure time of a next available flight when on the way to an airport, or a trader may purchase shares of stock at a certain price. The pertinent information from these requests or transactions may include the airline and the flight number for the traveler, as well as the stock name, the number of shares and the price being purchased for the trader. To be timely and periodically informed, one way is to electronically communicate the information requests from a mobile device that is connected to a wireless data network. The wireless data network, for example, connects, through a proxy server, to a flight information server or stock quote server from which the desired flight information or the current stock price can be retrieved by the mobile device on demand.

In some situations, the traveler or the trader may be prefer to be informed of any changes or updates to information without requesting the updates. For example, the trader may wish to be informed when a stock price hits a pre-set preferred price. In such a situation, the trader could subscribe to a service that notifies him if certain defined situations occur. Thus, a "push" information delivery system that automatically distributes updates is needed for users of wireless computing devices.

There are many different types of wireless data networks for connecting wireless client devices to the internet. Each wireless data network type has its own advantages and disadvantages. For example, circuit switched GSM (Global System for Mobile Communication) wireless networks include a useful Short Messaging System (SMS) for sending short text messages to wireless clients. But the Short Messaging System is only useful for very short messages. Delivering larger messages requires the wireless client device to establish a circuit in a carrier infrastructure via a wideband channel before communicating with any server on the network. Establishing the circuit connection can be both time consuming and costly to the users. Hence users generally prefer to have control over the communication of their mobile devices through the carrier infrastructure when accessing updated information from a web server. Other wireless networks, such as CDPD (Cellular Digital Packet Data) wireless networks, are packet switched networks. CDPD wireless networks provide a signaling mechanism that allows a signal to be sent when new information is available. However, no data is transmitted with the signaling mechanism.

Since a "push" system of information delivery is needed for users of wireless devices and there are several different types of a wireless networks, a unified push delivery mechanism would be desirable. A unified push information delivery system would allow internet hosts to push information to users of all types of wireless networks.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Notation and Nomenclature

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following is presented largely in terms of procedures, steps, logic blocks, processing, and other symbolic representations that resemble of data processing devices coupled to networks. These process descriptions and representations are the means used by those experienced or skilled in the art to most effectively convey the substance of their work to others skilled in the art. The method of the present invention along with the apparatus to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

A Wireless Data Network

Figure 1:
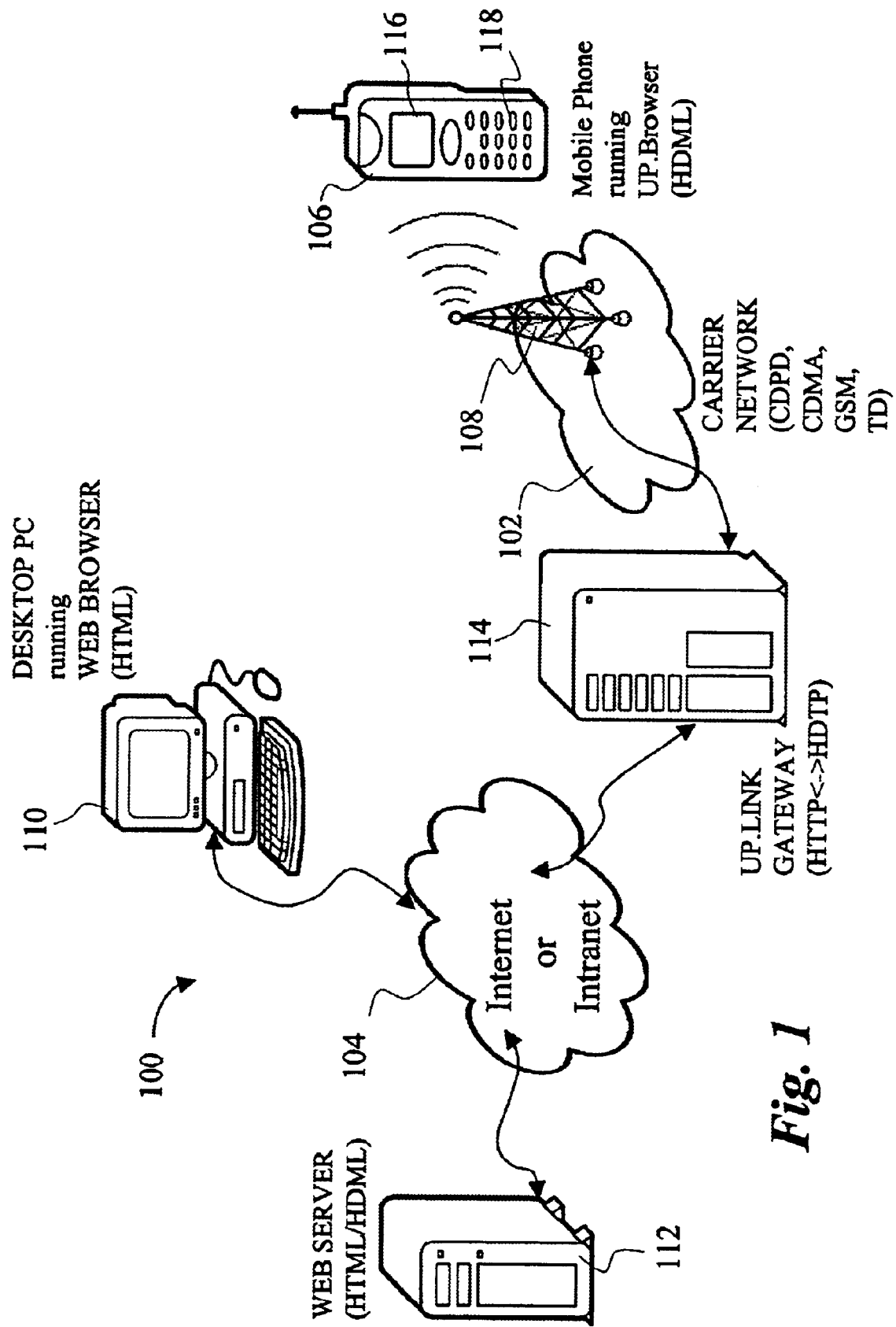
FIG. 1 illustrates a schematic configuration in which the present invention may be practiced.

Referring now to the drawings, in which like numerals refer to like parts throughout the several views. FIG. 1 illustrates a schematic configuration in which the present invention may be practiced. A data network 100 comprises an airnet 102 that is generally called wireless network and a landnet 104 that is generally a landline network, each acting as a communication medium for data transmission therethrough. Airnet 102, in which the data transmission is via the air, is sometimes referred to as a carrier network as well because each airnet is controlled and operated by a carrier, for example AT&T and GTE, each having its own communication scheme, such as CDPD, CDMA, GSM and TDMA for airnet 102. The airnet 102 may comprise more than one different type of wireless networks. For example, the airnet 102 may comprise a GSM network for some wireless client devices and a CDPD network for other wireless client devices.

Referenced by 106 is one of the two-way interactive communication devices that can be a mobile device, a cellular phone, a wireless personal digital assistant, or a wireless capable remote controller, capable of communicating, via airnet 102, with an antenna 108 that also represents a carrier infrastructure. It is generally understood that the carrier infrastructure or antenna 108 serves simultaneously a plurality of the two-way interactive communication devices, of which only one mobile device 106 is shown in the figure. Similarly, connected to Internet 104 are a plurality of desktop personal computers (PC) 110 and a plurality of web server computers 112, though only one representative, respectively, is shown in the figure. PC 110, as shown in the figure, may be a personal computer SPL 300 from NEC Technologies Inc. and runs a HTML Web browser via the Internet 104 using HTTP to access information stored in web server 112 that may be a workstation from SUN Microsystems Inc. It is understood to those skilled in the art that PC 110 can store accessible information therein so as to become a web server as well.

Between the Internet 104 and the airnet 102 there is a link infrastructure 120 that comprises a proxy server device 114 and the carrier infrastructure 108. Proxy server device 114, also referred to as proxy server or gateway server, may be a workstation or a personal computer and performs mapping or translation functions, for example, mapping from one protocol to another, thereby the mobile device 106 can be in communication with any one of the servers 112 or the PCs 110, respectively via the carrier infrastructure 108.

The wireless carrier infrastructure 108 generally comprises a base station and an operation center for each type of wireless network supported. The base station controls radio or telecommunication links with the mobile devices. The operation and maintenance center comprises a mobile switching center performing the switching of calls between the mobile devices and other fixed or mobile network users. Further, the operation and maintenance center manages mobile services, such as authentication and oversees the proper operation and setup of a wireless network. Each of the hardware components and processes in the base station and the operation and maintenance center for each type of wireless network is known to those skilled in the art and not to be described herein to avoid unnecessarily obscuring aspects of the present invention.

The communication protocol of the World Wide Web (WWW) on the Internet 104 is the well known HyperText Transport Protocol (HTTP) or HTTPS, a secure version of HTTP. HTTP runs on the Transport Control Protocol (TCP) and controls the connection of a well known HyperText Markup Language Web browser, or HTML Web browser in PC 110, to Web server 114, and the exchange of information therebetween. The communication protocol between mobile device 106 and proxy server 114 via airnet 102 is Handheld Device Transport Protocol (HDTP), which preferably runs on User Datagram Protocol (UDP) and controls the connection of a HDML Web browser in mobile device 106, to server 114, where HDML stands for Handheld Device Markup Language. HDML, similarly to HTML, is a tag based document language and comprises a set of commands or statements specified in a card that specifies how information displayed on a small screen of the mobile device 106. Normally a number of cards are grouped into a deck that is the smallest unit of HDML information that can be exchanged between the mobile device 106 and the proxy server 114. The specifications of HDTP, entitled "HDTP Specification" and HDML, entitled "HDML 2.0 Language Reference" are enclosed and incorporated herein by reference in their entirety.

HDTP is a session-level protocol that resembles HTTP but without incurring the overhead thereof and is highly optimized for use in thin client devices, such as the mobile devices, that have significantly less computing power and memory than that in a desktop personal computer. Further, it is understood to those skilled in the art that the UDP does not require a connection to be negotiated between a client and a server before information can be exchanged. Thus, using UDP eliminates the need of exchanging a large number of packets during a session creation between a client and a server. Exchanging a very small number of packets during a transaction is one of the desired features for a mobile device with very limited computing power and memory to effectively interact with a landline device.

To facilitate the description of the disclosed system, however, it is deemed necessary to recite some of the features in mobile device 106 that make the disclosed system work more efficiently. According to one embodiment, mobile phone 106 comprises a display screen 116 and a keyboard pad 118 that allow a user thereof to communicate interactively with the mobile phone. The hardware components including a microcontroller, a ROM and a RAM, referring to working memory, in mobile phone 106 are known to those skilled in the art. The compiled and linked processes of the present invention are typically stored in the ROM as a client module that causes mobile device 106 to operate with proxy server 114. With display screen 116 and keypad 118, a user of mobile device 106 can interactively communicate with proxy server 114 over airnet 102. Upon activation of a predetermined key sequence utilizing keypad 118, for example, the microcontroller initiates a communication session request to proxy server 114 using the client module in the ROM. Upon establishing the communication session, mobile device 106 typically receives a single HDML deck from proxy server 114 and stores the deck as cached in the RAM. As described above, an HDML deck comprises one or more cards. Each card includes the information required to generate a screen display on display screen 116. The number of cards in a card deck is selected to facilitate efficient use of the resources in mobile device 106 and in airnet network 102.

Figure 2:
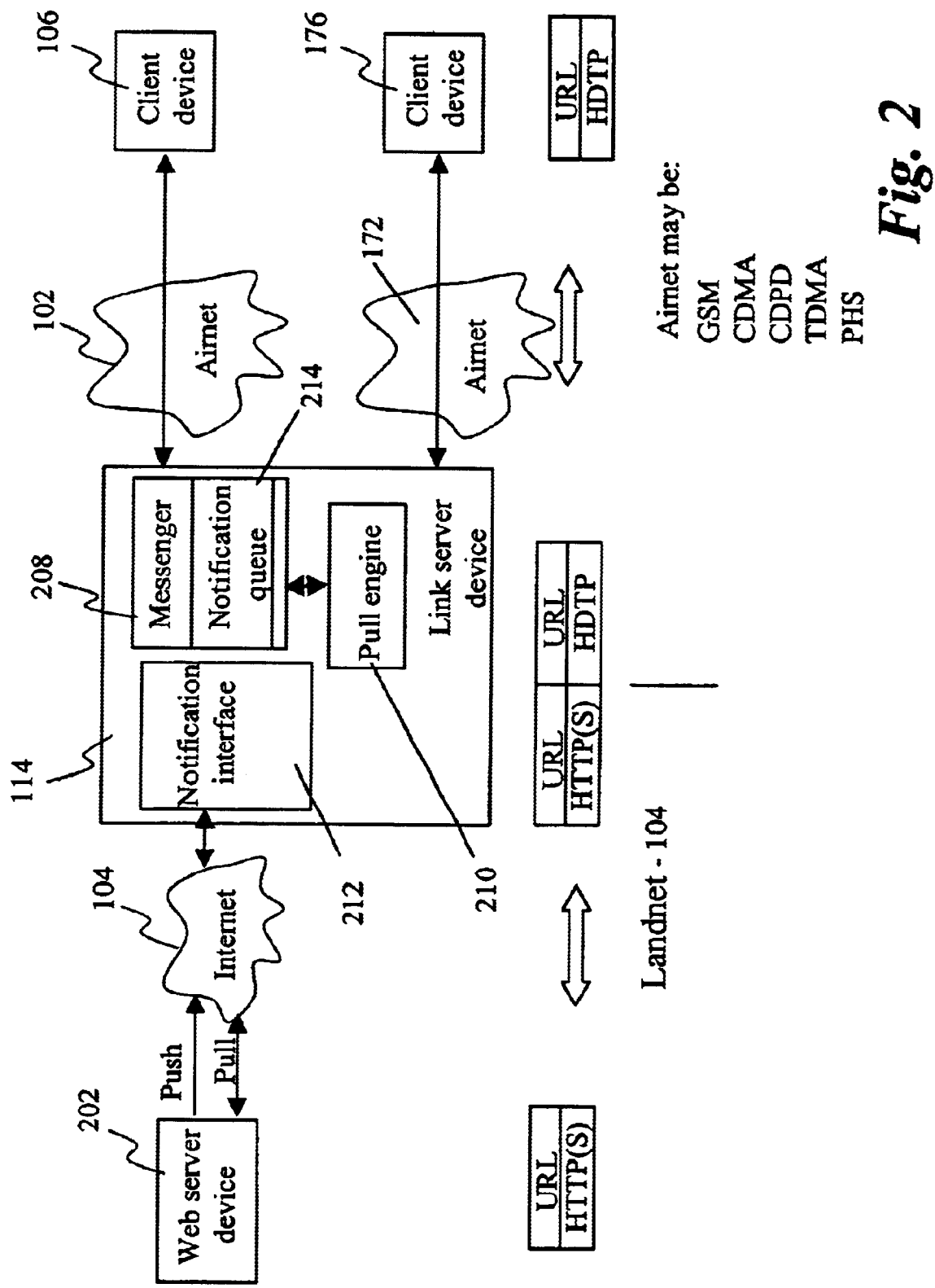
FIG. 2 illustrates a functional diagram of the disclosed system in the present invention.

Referring now to FIG. 2, there is shown a functional block diagram of the disclosed system. Web server device 202 provides accessible information to other computing devices on the Internet 104. A first mobile device 106 accesses the information in web server device 202 via proxy server device 114 through first wireless network 102. FIG. 2 further illustrates a second mobile device 176 that accesses the information in web server device 202 via proxy server device 114 through a second wireless network 172 that has different properties than the first wireless network 102. Thus, proxy server 114 is responsible for communicating with several wireless clients that communicate using different wireless infrastructures.

To avoid possible ambiguities in further description of the present invention, each server device, such as web server device 202 and proxy server device 114, refers to a piece of hardware equipment that comprises one or more microprocessors, working memory, buses and necessary interface and other components that are familiar to those skilled in the art while a server module means compiled and linked processes of the disclosed system loaded into the working memory to perform designated functions, according to the invention, through the parts and components in the server device.

Automatic Data Delivery

Referring to FIG. 2, if the user of a mobile device 106 or mobile device 176 wishes to be informed about updates to a particular web page on web server 202, then the user may "subscribe" to that page. As part of the subscription process with a particular Web server, the subscriber ID of the mobile device is recorded. The recordation of the subscriber ID enables the Web service provider or the Web server, to notify the user of mobile device 106 of any changes made to pages that are particularly subscribed by the user of mobile device 106. After mobile device 106 subscribes, Web server device 202 pushes an update notification when there is a change or update to the information page subscribed by mobile device 106. Accessible information is generally presented in hierarchical pages of hyperlinked HDML pages and each of the HDML pages is identified by a distinct address, such as a uniform resource locator (URL).

Figure 3:
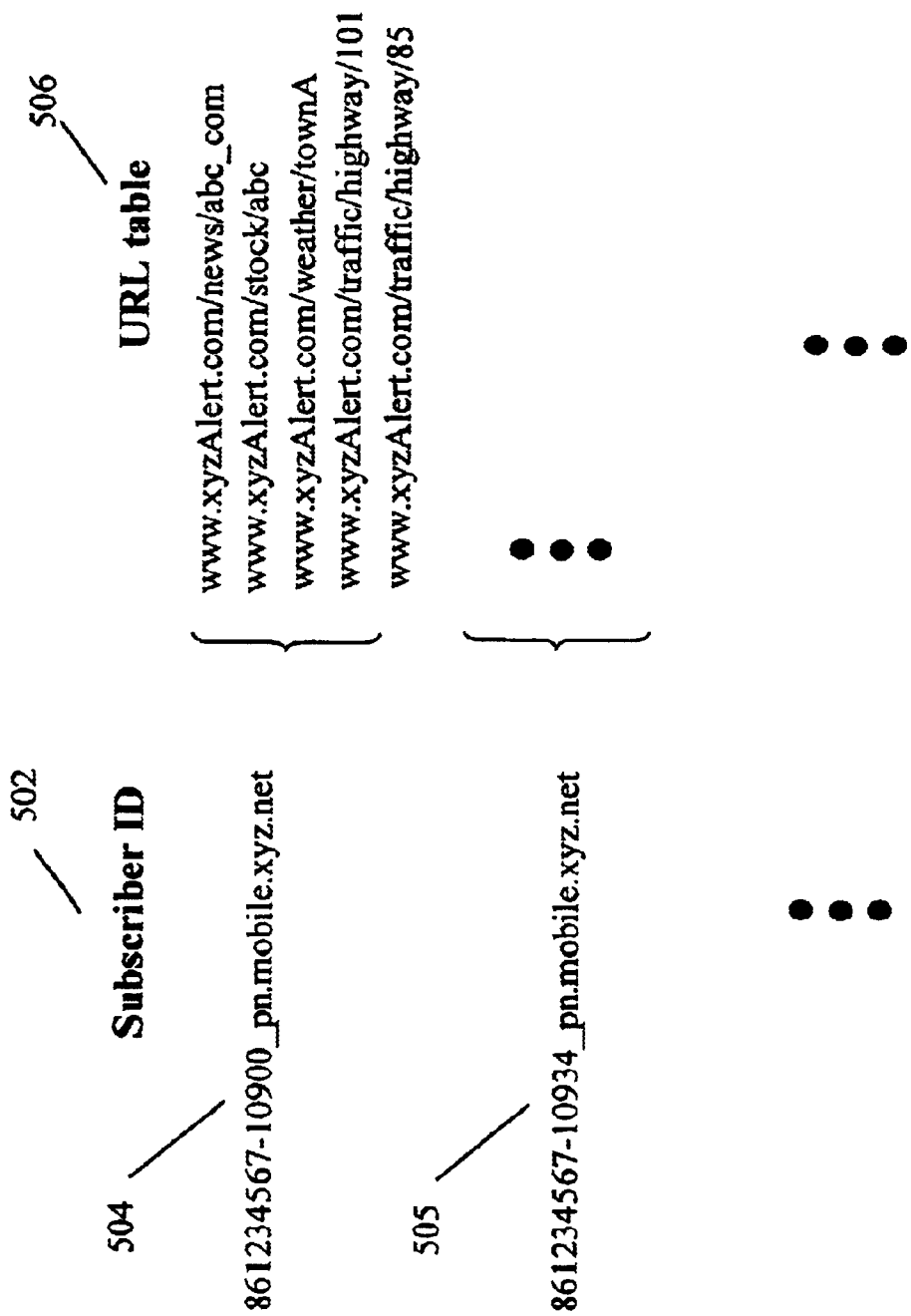
FIG. 3 illustrates a database of subscriber IDs and associated URLs in a Web server.

FIG. 3 illustrates a typical table maintained in a Web server that allows subscriptions. Referring to the table in FIG. 3, a subscriber ID list 502 maintains a list of subscriber IDs of the mobile devices through which the users desire to fetch information from the Web server and be informed of any changes to the particular pages. Associated with each subscriber in list 502 is a table of web pages to which the subscriber has "subscribed." As shown in FIG. 3, a subscriber with subscriber ID 861234567-10900_pn.mobile.xyz.net (504) subscribes to several web pages available on the web site at server www.xyzAlert.com. For example, the subscriber with subscriber ID 861234567-10900_pn.mobile.xyz.net (504) subscribes to a web page in the directory /stock/abc on web server www.xyzAlert.com that displays information on a company with the ticker symbol "ABC".

The URLs representing the information subscribed to by the user are grouped and maintained in URL table 506. It can be appreciated that subscriber ID list 502 generally maintains a plurality of subscriber IDs, each corresponding to one mobile device, typically one user thereof. Similarly, URL table 506 maintains a plurality of groups of URLs. Each group of URLs is associated with one mobile device. The group of URLs represent information subscribed to by the mobile device's user. When the Web server updates information in certain pages, URL table 506 is examined to see if any URLs match the modified news page. When a match is detected, the corresponding subscriber IDs in subscriber ID list 502 are sent notifications that inform the user about the updated information. For example, if a press release from ABC Company is added into the web page located by the URL www.xyzAlert.com/stock/abc then the subscriber with subscriber ID 861234567-10900_pn.mobile.xyz.net (504) will be sent an update notification. Update notifications inform the interested subscriber that the subscribed news has been updated.

There are many other applications to an update notification system. For example, an email server may have a destination mailbox for a wireless client device. When an email is delivered to the mailbox on the mail server, the mail server may send an update notification to the wireless client device. In another application, a systems administrator may program a server to send out urgent messages when an important server encounters difficulties. The systems administrator could program the server monitor program to send update notifications when trouble is detected.

Referring back to FIG. 2, when an internet server device 202 has an update to information subscribed to by several wireless client devices, the internet server 202 needs to send several update notifications to inform the several client devices that an update has occurred. However, the several wireless client devices, such as wireless client devices 106 and 176, may be connected to different wireless networks having different characteristics, such as CDMA, CDPD, and GSM. To simplify the notification task, proxy server 114 presents a single unified notification interface 212 that is used to serve several wireless client devices (106 and 176) connected to several different wireless networks (102 and 172) having different characteristics, such as CDMA, CDPD, and GSM.

The update notification sent by we server 202 must be properly formatted in order to be processed by proxy server 114. Additional details on the design, construction and operation of proxy server 114, referred to as network gateway, are described in the U.S. patent application filed on Apr. 30, 1998, having Ser. No. 09/070,668, entitled "Method and Apparatus for Providing Network Access Over Different Wireless Networks" by Seetharaman Ramasubramani et al, also inventors thereof, filed concurrently herewith, now U.S. Pat. No. 6,314,108, which is incorporated herein by reference in its entirety. According to one embodiment of the present invention, there are two different types of update notifications: Push notifications and Pull notifications.

A Push notification instructs the proxy server 114 to attempt to contact a wireless client to send updated information to the wireless client. A push notification includes a data payload that is delivered to the wireless client. Thus, the Push notification "pushes" the updated information to the wireless client.

A Pull notification instructs the proxy server 114 to place an update notification addressed to a particular wireless client in a notification queue 214. The notification queue 214 is described in detail in the U.S. patent application entitled "Method and Apparatus for Integrating Narrowband and Wideband Data Transports" with Ser. No. 09/071,379 by Stephen S. Boyle et al, filed concurrently herewith now U.S. Pat. No. 6,138,158, which is incorporated herein by reference in its entirety. The Pull notification does not include any payload data other than an address where updated information is available. When the addressed wireless client contacts the proxy server 114, the proxy server 114 will fetch all the information referenced by all the queued pull notifications for that wireless client and deliver that information to the wireless client. Thus, when a Pull notification is used, the proxy server 114 pulls the information from the address specified in the pull notification and then delivers that information to the wireless client.

To send Push and/or Pull notifications, a web server 202 sends a properly formatted HTTP "POST" request that represents an "add notification" request to proxy server 114. Thus, any web server host connected to the Internet can send an update notification to client devices by contacting the appropriate proxy server with an add notification request. To prevent misuse by rogue internet sites, the proxy server 114 performs authentication using certificates.

To add a new notification or replace an old notification, an Internet host, e.g. server device 202, submits an HTTP POST request to a proxy server specifying /ntfn/add as the Request-URI. For more information on the HTTP protocol see the Internet Engineering Task Force (IETF) Request For Comments (RFC) publication numbers 1945 and 2068 (RFC 1945 and RFC 2068). Each add notification request adds or replaces a single notification. When replacing a notification, the Internet host does not need to explicitly request that a notification be replaced. Instead, the proxy server will automatically replace an existing notification if a new notification matches an existing notification. Specifically, a replacement will be performed if a subsequently received notification matches the same subscriber ID, matches the same channel (push or pull), and has the same notification identifier.

The present invention also discloses a set of notification maintenance requests. In one embodiment, the notification maintenance requests include a delete notification request, a notification status request, and a clear notifications request. The delete notification request allows Internet hosts to delete previously added notifications. The notification status request allows an Internet host to check on the status of a previously added notification. Finally, the clear notifications request allows an Internet host to clear all the notifications that have been sent but not yet delivered to a particular subscriber. The maintenance requests, like the add notification requests, are made by sending an HTTP POST method to the proxy server 114.

To describe the various notification requests, this document will use the augmented BNF notational rules defined in the Internet Engineering Task Force (IETF) Request For Comments (RFC) publication 2068 (RFC 2068) that is hereby incorporated by reference in its entirety. An Add Notification request may be a Push notification or a Pull notification:

Add-Ntfn-Request=Add-Push-Ntfn|Add-Pull-Ntfn

Add Push Notification Request Details

Push notification requests are used by Internet web servers to send limited amounts of information to wireless client devices. As described, a Push notification request contains more information than a Pull notification request does. Specifically, a push notification request includes the pushed information content along with the related headers. The syntax for an Add Push notification request is as follows:

Add-Push-Ntfn=
    "POST" SP "/ntfn/add" SP HTTP-Version CRLF
    X-Up-Upnotifyp-Version CRLF
    X-Up-Subno CRLF
    X-Up-Ntfh-TTL CRLF
    "x-up-ntfn-channel" ":" "push" CRLF
    [(Content-Base|Content-Location) CRLF]
    [X-Up-Ntfn-ID CRLF]
    Content-Type CRLF
    Content-Length CRLF
    CRLF
    entity body The first ("POST") request line defines this is an HTTP POST method request. However, the request-URI "/ntfn/add" further defines this request as an "add notification" request that is recognized by proxy servers for wireless devices.

The X-Up-Upnotifyp-Version header defines which version of the notification protocol is being used. Since different versions of the notification protocol are used, the X-Up-Upnotifyp-Version header is used to ensure interoperability between different versions.

The X-Up-Subno header specifies a Subscriber number for a subscriber that should receive the notification. The syntax of this header is:

X-Up-Subno="x-up-subno ":" Subscriber-ID
    Subscriber-ID="Subscriber-Name" "_" Proxy-DNS-Name
    Subscriber-Name=<unique identifier for subscriber>
    Proxy-DNS-Name=<fully-qualified DNS name of proxy server>

A typical header using a "timestamp-serialNumber" convention for the unique identifier would be:

x-up-subno: 859852091-966_devgate2.uplanet.com

The X-Up-Ntfn-TTL header specifies how long a proxy server should try to deliver the notification before giving up (a Time To Live). The syntax for the X-Up-Ntfn-TTL header is:

X-Up-Ntfn-TTL="x-up-ntfn-ttl" ":" 1*DIGIT

The number parameter specifies the time for the notification to live in seconds.

The X-Up-Ntfn-Channel specifies the type of delivery channel that will be used to deliver the notification. Specifically, the delivery channel is defined as push or pull. For a Push notification, the X-Up-Ntfn-Channel header syntax is:

X-Up-Ntfn-Channel="x-up-ntfn-channel" ":" "push"

The Content-Base or Content-Location header is a standard HTTP header that specifies the URL of updated content. A Content-Base is an incomplete internet URL that can be combined with a relative URL to form a complete URL. A Content-Location is a complete URL that defines the location of updated content. The Content-Base or Content-Location header field is optional for push notifications. The internet domain address portion in the Content-Base or Content-Location header is used to authenticate the request. Specifically, the proxy server authenticates the internet domain using a client certificate. The add notification request must be authenticated since an add notification request may replace a previous notification having the same subscriber ID. Without authentication, a rogue entity could delete notifications by making add notification requests that match existing notifications.

The X-Up-Ntfn-ID header specifies an identifier assigned to the notification by the host. The syntax for the X-Up-Ntfn-ID header is:

X-Up-Ntfn-ID="x-up-ntfn-id" ":" 1*512CHAR

Thus, a US-ASCII string up to 512 bytes long identifies the notification. The internet host that sent the notification request should use this notification identifier for subsequent status requests or delete requests. The X-Up-Ntfn-ID header field is optional. If a X-Up-Ntfn-ID header is not provided, then a URL in the Content-Location field will be used as an identifier.

The Content-Type and Content-Length fields specify the type and length of the data stored in the entity body of the push notification. The following MIME media types are currently defined to work with the proxy server:

application/x-up-alert application/x-up-cacheop multipart/mixed

The "application/x-up-alert" content type describes an entry for the wireless client's alert status card. The "application/x-up-cacheop" defines a cached URL page or a URL prefix that should be invalidated. Thus, the "application/x-up-cacheop" content type can be used to force a fresh page to be reloaded. The "multipart/mixed" content type is used to perform a combination alert and cache invalidation. Other types of acceptable content types can be added in future revisions.

After a push add notification request has been made, the proxy server examines the push request to make sure it is properly formatted and can be honored. If the push request is acceptable, the proxy server returns an HTTP status 204 ("No Content") to the internet host that indicates the request message was received and processed.

If an error is detected, the proxy server will return an error response to the internet host. Each different error generates a different response message.

A malformed notification request will cause a "Bad-Request" response to be sent back. The "bad request" message will include the HTTP status 400 ("bad request"). The "bad request" response will also indicate the error detected in the notification request. The application should not resend the request without correcting the error.

If the push notification request attempts to use a media type not supported by push notifications, then the proxy server will respond with a "Unsupported Media Type" message. The "Unsupported Media Type" response will include the HTTP status 415.

To prevent abuse of the notification system, the proxy server limits the size of content that may be sent. If a push notification request is too large, then the proxy server will return a "Request Entity Too Large" message with HTTP status 413.

Other situations that will generate error responses include internet hosts that are not authorized to access the notification service, an unsupported version, or any other reason why the server cannot fulfill the request.

Add Pull Notification Request Details

Add Pull notification requests are very similar to Push notifications except that Add Pull notification requests do not include information content. Add Pull notification requests only include a URL that specifies where new information is available. The syntax for a Pull notification request is as follows:

Add-Pull-Ntfn=
  "POST" SP "/ntfn/add" SP HTTP-Version CRLF
  X-Up-Upnotifyp-Version CRLF
  X-Up-Subno CRLF
  X-Up-Ntfn-TTL CRLF
  "x-up-ntfn-channel" ":" "pull" CRLF
  Content-Location CRLF
  [X-Up-Ntfn-ID CRLF]
  CRLF It should be noted that a pull notification does not contain an entity body. The pull notification includes a URL in the Content-Location field that identifies the location of the updated information.

After a pull add notification request has been made, the proxy server examines the pull notification request to make sure it is properly formatted and can be honored. If the pull request is acceptable, the proxy server returns an HTTP status 204 ("No Content") to the internet host that indicates the pull notification request was received and processed.

If an error is detected, the proxy server will return an error response to the internet host. Each different error generates a different response message. A malformed notification request will cause a "Bad-Request" response to be sent back. The "bad request" message will include the HTTP status 400 ("bad request"). The "bad request" response will also indicate the error detected in the pull notification request. Other situations that will generate error responses include internet hosts that are not authorized to access the notification service, an unsupported version, or any other reason why the server cannot fulfill the request.

Notification Status Requests

After an internet server has sent an add notification request to a proxy server, the internet server can check the status of the notification by sending a notification status request. Both pending and completed notifications may be queried. However, the proxy server will only retain the status of completed notifications for a limited amount of time. In one embodiment, the proxy server maintains information on notifications for 48 hours.

Like the add notification request, notification status requests are sent to the proxy server as a properly formatted HTTP POST request. The syntax for the notification status request is:

Ntfn-Status-Request=
  "POST" SP "/ntfn/status" SP HTTP-Version CRLF
  X-Up-Upnotifyp-Version CRLF
  X-Up-Subno CRLF
  X-Up-Ntfn-Channel CRLF
  X-Up-Ntfn-ID|Content-Location CRLF
  CRLF The notification to be queried is identified by subscriber ID, channel, and notification identifier. If no notification identifier was provided in the add notification request used to send the notification originally, then the Content-Location is used to identify the notification request.

While there can only be one pending notification with matching attributes, it is possible that more than one completed notification matches the attributes described by the status request. If there is a pending notification that matches, then the proxy server returns the status of that pending notification. If there is not a pending notification that matches but there is more than one completed notification, then the status of the most recently completed notification is presented.

If a proxy server receives a properly formatted status request from a host that has permission to access the notification service and finds a matching notification, then the proxy server returns an HTTP status 200 ("OK") response with the notification status. The status of the notification may be pending, delivered, expired, or undeliverable.

When a matching notification is found, the proxy server verifies that the host requesting status has permission to access the notification. If the host does not have permission, then the proxy server returns an error response informing the host that the host does not have permission. Error responses will also be generated when the request is malformed, no matching notification is found, the version is not supported, or any other reason the request could not be fulfilled.

Delete Notification Requests

After an internet server has sent an add notification request, the internet server may later decide to cancel the delivery of the notification. To delete a notification, an internet server sends the proxy server a properly formatted HTTP POST method defining a delete notification request. Only pending notifications may be deleted.

The syntax for the delete notification request is:
Delete-Ntfn-Request=
  "POST" SP "/ntfn/delete" SP HTTP-Version CRLF
  X-Up-Upnotifyp-Version CRLF
  X-Up-Subno CRLF
  X-Up-Ntfn-Channel CRLF
  X-Up-Ntfn-ID|Content-Location CRLF
  CRLF The delete notification request identifies a notification to delete by subscriber ID, channel, and notification identifier. If no notification identifier was provided in the add notification request used to send the notification originally, then the Content-Location is used to identify the notification.

When a matching notification is found, the proxy server verifies that the host requesting the delete has permission to access the notification. If the host does not have permission, then the proxy server returns an error response informing the host that the host does not have permission. If a proxy server receives a properly formatted delete notification request from a host that has permission to delete a located matching notification, then the proxy server returns an HTTP status 204 ("No Content") response. The HTTP status 204 ("No Content") response indicates that the specified notification was deleted.

If the delete notification request is malformed, then the proxy server returns a "bad request" response with HTTP status 400. If the delete notification request is not malformed but no matching notification is located, then the proxy server returns a "Not found" message with HTTP status 404. Error responses will also be generated when the request is malformed, no matching notification is found, the version is not supported, or any other reason the request could not be fulfilled.

Clear Notifications Requests

An internet server may also clear all notifications that are pending for a particular subscriber and fall within a particular content location domain by using a "clear notifications" request. The proxy server responds to clear notifications requests by finding all notifications that have a matching subscriber ID and that originated from a matching content location domain. Only pending notifications may be cleared. Notifications that have already been delivered will not be affected.

The clear notifications request identifies notifications using a subscriber ID and a URL. The syntax for the clear notifications request is:
Clear-Ntfn-Request=
  "POST" SP "/ntfn/clear" SP HTTP-Version CRLF
  X-Up-Upnotifyp-Version CRLF
  X-Up-Subno CRLF
  X-Up-Ntfn-Channel CRLF
  [(Content-Base|Content-Location) CRLF]
  CRLF The clear notifications request identifies notifications to clear by locating pending notifications having a matching subscriber ID and a content location that prefix-matches the URL in the clear notification request. Note that the URL from the Content-Base or Content-Location must be absolute and must contain a complete "net_loc" field.

When matching notifications are found, the proxy server verifies that the host requesting the clear notification operation has permission to access the notifications. If the host does not have permission to access the notifications, then the proxy server returns an error response informing the host that the host does not have permission. If a proxy server receives a properly formatted clear notifications request from a host that has permission to clear matching notifications, then the proxy server returns an HTTP status 204 ("No Content") response after deleting the notifications. The HTTP status 204 ("No Content") response indicates that the specified notifications were deleted or that no matching pending notifications were found.

If the clear notifications request is malformed, then the proxy server returns a "bad request" response with HTTP status 400. Error responses will also be generated when the version is not supported or, if for any other reason, the clear notifications request could not be fulfilled.

Update Notification Operational Examples

To illustrate how the unified notification system of the present invention operates, examples of notification delivery are presented. Push and Pull notification delivery is presented for both circuit switched GSM networks and packet switched CDPD networks.

Push Notification on GSM Systems

Figure 4:
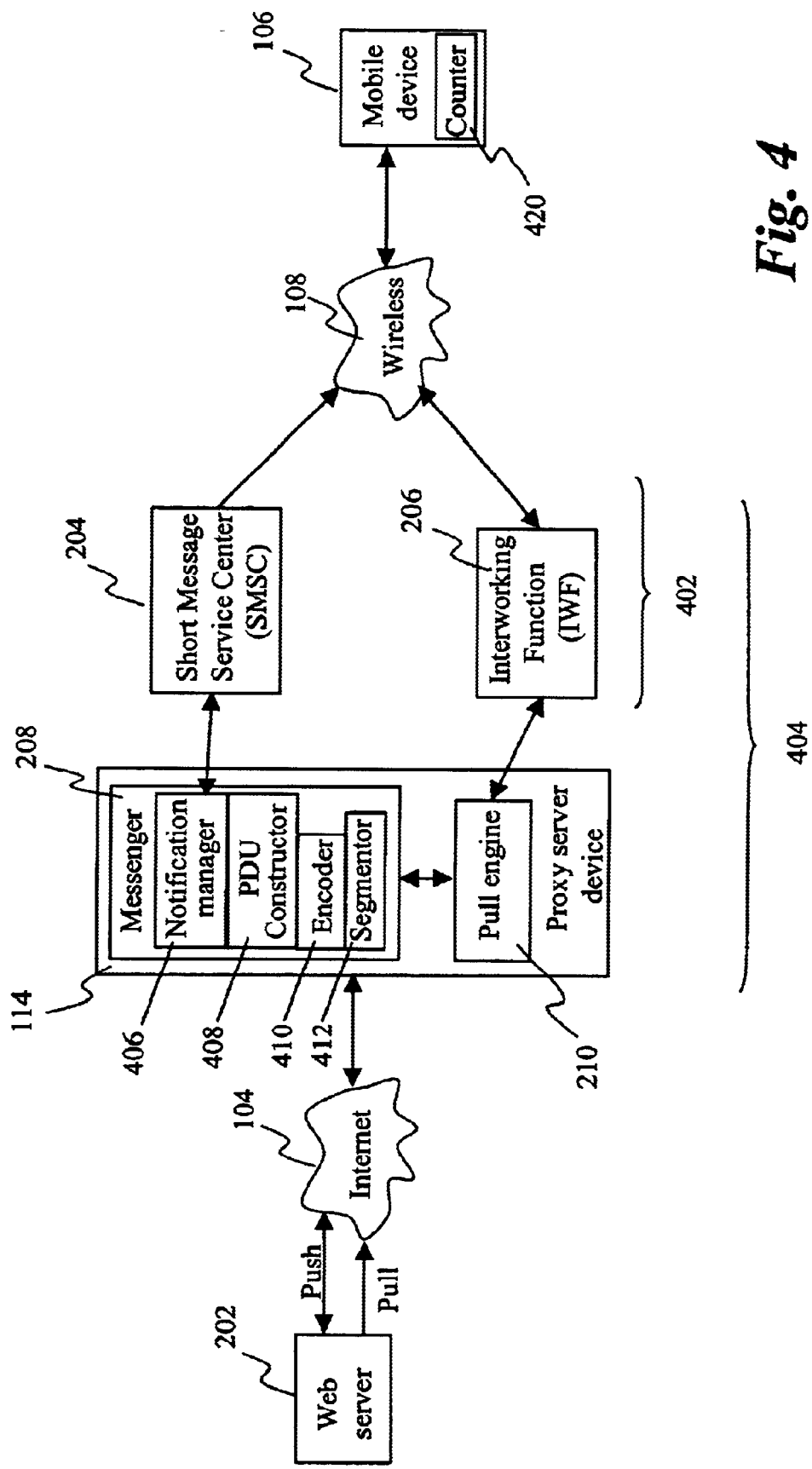
FIG. 4 shows a block diagram of an internet host communicating with a proxy server where the proxy server communicates to wireless clients using a GSM wireless network with a short message service (SMS).

A GSM wireless network is a circuit switched network that only delivers information on its main channel when a circuit has been established. An example of a proxy server 114 coupled to a GSM wireless network is illustrated in FIG. 4. Since it is costly to deliver information across the main channel, the IWF channel 206, of a GSM network, the IWF channel 206 is not used unless the user of a GSM device establishes a circuit. Then, the proxy server 114 will use the bandwidth available on the established circuit.

However, most GSM networks also include a Short Messaging System (SMS) 204 that allows short text messages to be sent. When a properly formatted add push notification request is received by a proxy server connected to a GSM circuit switched wireless network, a messenger program 208 in the proxy server 114 forms a push message that is sent using the Short Messaging System 204.

Pull Notification on GSM System

Referring again to FIG. 4, when a proxy server connected to a GSM network receives a properly formatted add pull notification request, the messenger program 208 in the proxy server places a pull notification into a notification queue. The notification queue may be part of a subscriber database.

Referring again to FIG. 4, when the wireless client device later contacts the proxy server, pull engine 210 of the proxy server 114 will get all the queued pending notifications for the wireless client device. All push notifications that are still pending will immediately be delivered. For pull notifications, the pull engine 210 will then pull the information specified in each pull notification from the internet host that sent the pull notification. The pull engine 210 then delivers the pulled information to the wireless client device.

Push and Pull Notifications on CDPD Systems

A CDPD network is a packet switched network (not shown). When a push notification is received by a proxy server connected to a CDPD wireless network, the messenger program in the proxy server stores the push notification into a notification queue and sends a signal PDU to the wireless client. A signal PDU is a short message that merely informs the wireless client that a notification is in the proxy server awaiting delivery.

In a CDPD wireless network, pull notifications are delivered in the same manner. Specifically, the pull notification is placed into a notification queue in the proxy server and then a signal PDU is sent to the wireless client. Later, when the wireless client contacts the proxy server, the pull engine will pull the data for the pull notifications and deliver the data to the wireless client. The difference between push notifications and pull notifications in CDPD systems is that push notifications actually contain updated information whereas pull notifications only include the address of updated information. Thus, the proxy server is required to pull the updated information from the server.

Referring back to FIG. 4, it is understood that server device 202 may serve a large number of wireless client devices that communicate therewith via different proxy server devices. Web server device 202 sends out the notification sequentially to affected subscribers via proxy server device 114. Proxy server device 114 is identified by a portion of the subscriber ID, for example, pn.mobile.xyz.net, which identifies which proxy server device on the Internet is supposed to receive the notification.

With the teachings of the present invention, a single proxy server 114 can also be used to serve notifications to multiple wireless networks with different types of characteristics. Specifically, when an incoming notifications request is received, the messenger program looks up the account of the subscriber identified in the notification request message. Then, based upon the type of wireless network used by the subscriber, the messenger program delivers the notification to the subscriber in the appropriate manner.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of embodiments.

We claim:

1. A method of delivering update notifications from a server computer to wireless client devices, said method comprising:

accepting an update notification in a proxy server, said update notification generated by said server computer when said server computer has updated information, said update notification addressed to a particular wireless client device, said proxy server coupled to a first wireless network;

queuing said update notification in a notification queue in said proxy server;

forming a client update notification to comply with characteristics of the first wireless network; and delivering said client update notification to said particular wireless client device across said first wireless network.

2. The method as claimed in claim 1 further comprising:

responding to said an HTTP POST method with an HTTP response with a status code from said proxy server to said server computer.

3. The method as claimed in claim 1 wherein said HTTP POST further defines said notification request as a push notification having a data payload.

4. The method as claimed in claim 3 wherein said first wireless network comprises a GSM network and said method further comprises:

sending said client update notification across a Short Messaging System in said wireless network.

5. The method as claimed in claim 1 further comprising:

receiving a maintenance request from said server.

6. The method of claim 5 wherein said maintenance request comprises a delete notification request identifying an earlier update notification, said method further comprising:

deleting said earlier update notification in said proxy server if said earlier update notification is found in said notification queue.

7. The method of claim 5 wherein said maintenance request comprises a notification status request identifying an earlier update notification, said method further comprising:

returning status of said earlier update notification from said proxy server if said earlier update notification is found in said notification queue.

8. The method as claimed in claim 1 wherein said HTTP POST further defines said notification request as a pull notification having an address identifying a location of updated data.

9. The method as claimed in claim 8 further comprising:

storing said pull notification in a notification queue within said proxy server; and sending a signal PDU to said particular wireless client device if said wireless client device is on a CDPD wireless network.

10. The method as claimed in claim 8 further comprising:

fetching said updated data from said address when said particular wireless client device contacts said proxy server.

11. A method of delivering update notifications from server computers to wireless client devices, said method comprising:

receiving in a proxy server an add notification request generated by a server computer having updated information, said add notification request addressed to a particular wireless client device;

queuing said add notification request in a notification queue in said proxy server;

delivering a notification alerting said particular wireless client device of said updated information if said add notification request is a "pull" notification request; and delivering said updated information to said wireless client device across said first wireless network if said add notification request is a "push" notification request.

12. The method as claimed in claim 11 wherein said add notification request comprises an HTTP POST method.

13. The method as claimed in claim 11 further comprising:

responding to said add notification request with a response from said proxy server to said server computer, said response having a status code.

14. The method as claimed in claim 11 wherein said push notification request comprises a data payload of said updated information.

15. The method as claimed in claim 14 further comprising:

sending a push notification formatted in across a Small Messaging System in a GSM wireless network.

16. The method as claimed in claim 14 further comprising:

storing a push notification in a notification queue within said proxy server; and sending a signal PDU to said particular wireless client device if said wireless client device is on a CDPD wireless network.

17. The method as claimed in claim 11 wherein said pull notification request comprises an address identifying a location of said updated information.

18. The method as claimed in claim 17 further comprising:

storing said pull notification in a notification queue within said proxy server; and sending a signal PDU to said particular wireless client device if said wireless client device is on a CDPD wireless network.

19. The method as claimed in claim 17 further comprising:

fetching said updated data from said address when said particular wireless client device contacts said proxy server.

20. The method as claimed in claim 11, said method further comprising:

receiving a delete notification request from said server computer in said proxy server, said delete notification request identifying an earlier notification request;

deleting said earlier notification in said proxy server if said earlier notification request is found in said notification queue.

21. The method as claimed in claim 11, said method further comprising:

receiving a notification status request from said server computer in said proxy server, said notification status request identifying an earlier notification request; and returning status of said earlier notification request in said proxy server if said earlier notification request is found in said notification queue.

22. A proxy server for delivering update notifications from a server computer to wireless client devices on a wireless network, said proxy server comprising:

a wireless network interface, said wireless network interface coupling said proxy server to said wireless network;

a notification interface for accepting an update notification in a proxy server, said update notification generated by said server computer when said server computer has updated information, said update notification addressed to a particular wireless client device;

a notification queue for queuing said update notification in said proxy server; and a messenger program for forming a client update notification to comply with characteristics of the first wireless network and delivering said client update notification to said particular wireless client device across said wireless network.

23. The proxy server as claimed in claim 22 wherein said messenger program further responds to said update notification with a response with a status code from said proxy server to said server computer.

24. The proxy server as claimed in claim 22 wherein said update notification comprises a push notification request having a data payload.

25. The proxy server as claimed in 24 wherein said wireless network comprises a GSM network and said messenger program sends said client update notification across a Short Messaging System in said wireless network.

26. The proxy server as claimed in claim 22 wherein said update notification comprises a pull notification request having an address identifying a location of updated data.

27. The proxy server as claimed in claim 26 wherein said messenger program sends sending a signal PDU to said particular wireless client device if said wireless client device is on a packet-switched wireless network.

28. The proxy server as claimed in claim 26 wherein said messenger program fetches said updated data from said address when said particular wireless client device contacts said proxy server.

29. The proxy server of claim 22 wherein said notification interface receives a delete notification request identifying an earlier update notification and said messenger program deletes said earlier update notification in said proxy server if said earlier update notification is found in said notification queue.

30. The proxy server of claim 22 wherein said notification interface receives a notification status request identifying an earlier update notification and said messenger program returns a status of said earlier notification in said proxy server if said earlier update notification is found in said notification queue.

* * * * *